(12) United States Patent
Chang et al.

(10) Patent No.: US 11,299,013 B2
(45) Date of Patent: Apr. 12, 2022

(54) METHOD AND APPARATUS FOR ACTIVE VEHICLE CABIN OCCUPANT PROTECTION SYSTEM

(71) Applicant: GM GLOBAL TECHNOLOGY OPERATIONS LLC, Detroit, MI (US)

(72) Inventors: Insu Chang, Troy, MI (US); Edward R. Masters, Brighton, MI (US); Dooil Hwang, Rochester Hills, MI (US); Zhe Li, Pudong (CN); Jeremie Dernotte, Rochester, MI (US); Mohammad Firouz, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 360 days.

(21) Appl. No.: 16/450,117

(22) Filed: Jun. 24, 2019

(65) Prior Publication Data

US 2020/0398640 A1    Dec. 24, 2020

(51) Int. Cl.
*B60H 1/00* (2006.01)
*B60H 1/24* (2006.01)
*B60H 1/26* (2006.01)

(52) U.S. Cl.
CPC ..... *B60H 1/00892* (2013.01); *B60H 1/00742* (2013.01); *B60H 1/00792* (2013.01); *B60H 1/00828* (2013.01); *B60H 1/245* (2013.01); *B60H 1/262* (2013.01); *B60H 2001/0015* (2013.01)

(58) Field of Classification Search
CPC ............ B60H 1/00878; B60H 1/00457; B60H 1/0075; B60H 1/00807; B60H 1/00835; B60H 2001/3255; B60H 2001/3266
See application file for complete search history.

(56) References Cited

U.S. PATENT DOCUMENTS

| 6,811,201 | B2 | 11/2004 | Naik | |
|---|---|---|---|---|
| 2004/0119313 | A1* | 6/2004 | Naik | B60J 3/0204 296/97.2 |
| 2014/0034266 | A1* | 2/2014 | Tabei | B60H 1/00842 165/42 |
| 2018/0251009 | A1* | 9/2018 | Fujii | B60H 1/00885 |
| 2018/0370431 | A1* | 12/2018 | Wincek | G01V 3/088 |
| 2019/0077217 | A1* | 3/2019 | Yu | B60H 1/00735 |
| 2020/0346511 | A1* | 11/2020 | Hasegawa | B60H 1/00849 |

* cited by examiner

*Primary Examiner* — Jianying C Atkisson
*Assistant Examiner* — Meraj A Shaikh
(74) *Attorney, Agent, or Firm* — Lorenz & Kopf LLP (57) ABSTRACT

Methods and apparatus are provided for active vehicle cabin occupant protection system. The method includes detecting a vehicle cabin temperature using a cabin thermal sensor, engaging a vehicle fan and opening a vehicle outside air ventilation duct in response to the vehicle cabin temperature exceeding a first threshold temperature, and starting a vehicle engine and engaging a vehicle air conditioning system in response to the vehicle cabin temperature exceeding a second threshold temperature wherein the second threshold temperature is greater than the first threshold temperature.

20 Claims, 5 Drawing Sheets

METHOD AND APPARATUS FOR ACTIVE VEHICLE CABIN OCCUPANT PROTECTION SYSTEM

INTRODUCTION

The present disclosure relates generally to a system for occupant protection from excessive vehicle cabin temperature. More specifically, aspects of the present disclosure relate to systems, methods and devices for detecting an occupant in a vehicle, engaging a ventilation system in response to a first temperature and engaging an air conditioning system in response to a second temperature.

Extreme vehicle cabin temperatures resulting from solar radiation and lack of ventilation may result in vehicle damage as well as occupant injury or death. The temperature increases in the vehicle cabin are intensified by solar radiation passing through the car glass surfaces, such as windows, windshields, and glass roof panels. Solar radiation passing through these glass surfaces may be absorbed by materials in the cabin such as the dashboard, seats, and other interior panels and surfaces which are often dark colors and thus absorb more energy. These hot surfaces then contribute to the increased temperatures within the vehicle cabin.

Increased vehicle cabin temperatures provide a threat to children or pets forgotten, left intentionally or trapped in a vehicle who then face the risk of a heat stroke. Numerous infant and pet fatalities occur each year as a result of being left inside a vehicle during hot or sunny days. A distracted caregiver or an unexpected event can lead to such a situation. It would be desirable to provide a robust system to address temperature increase within a vehicle cabin when occupants are present to overcome the aforementioned problems.

The above information disclosed in this background section is only for enhancement of understanding of the background of the invention and therefore it may contain information that does not form the prior art that is already known to a person of ordinary skill in the art.

SUMMARY

Disclosed herein are methods and systems and related control logic for provisioning computational systems, methods for making and methods for operating such systems, and motor vehicles equipped with onboard control systems. By way of example, and not limitation, there is presented various embodiments of vehicle interior temperature control to protect vehicle occupants are disclosed herein.

In accordance with an aspect of the present invention an apparatus is provided having a cabin temperature sensor for detecting a vehicle cabin temperature, a ventilation system having a fan and an outside air duct for introducing outside air into a vehicle cabin, an air conditioning system driven by a vehicle engine for cooling the vehicle cabin, and a processor for engaging the ventilation system in response to the vehicle cabin temperature exceeding a first threshold temperature and for engaging the air conditioning system in response to the vehicle cabin temperature exceeding a second threshold temperature wherein the second threshold temperature is greater than the first threshold temperature.

In accordance with another aspect of the present invention a transmitter is provided for transmitting an alert to an emergency services provider in response to the vehicle cabin temperature exceeding the second threshold temperature.

In accordance with another aspect of the present invention an outside temperature sensor is provided for measuring an outside temperature and wherein the vehicle cabin temperature is detected in response to the outside temperature exceeding a third threshold temperature.

In accordance with another aspect of the present invention an occupancy detector is provided for detecting the absence of a driver and wherein the vehicle cabin temperature is detected in response to the detected absence of the driver.

In accordance with another aspect of the present invention an occupancy detector is provided for detecting a vehicle occupant and wherein the wherein the vehicle cabin temperature is detected in response to the detection of a vehicle occupant.

In accordance with another aspect of the present invention a carbon monoxide detector is provided for detecting a vehicle cabin carbon monoxide level and wherein the processor is further operative to engage the ventilation system in response to the vehicle cabin carbon monoxide level exceeding a carbon monoxide level threshold value.

In accordance with another aspect of the present invention a sunshade and a luminance detector are provided for detecting a luminance level outside of the vehicle and wherein the sunshade is deployed in response to the luminance level exceeding a luminance threshold value and the vehicle cabin temperature exceeding the first threshold temperature.

In accordance with another aspect of the present invention a vehicle ignition switch is provided and wherein the detecting of the vehicle cabin temperature is made in response to the ignition switch being in an off position.

In accordance with another aspect of the present invention a method is provided including detecting a vehicle cabin temperature using a cabin thermal sensor, engaging a vehicle fan and opening a vehicle outside air ventilation duct in response to the vehicle cabin temperature exceeding a first threshold temperature, and starting a vehicle engine and engaging a vehicle air conditioning system in response to the vehicle cabin temperature exceeding a second threshold temperature wherein the second threshold temperature is greater than the first threshold temperature.

In accordance with another aspect of the present invention, the method includes generating an alert and transmitting the alert via a wireless network in response to the vehicle cabin temperature exceeding the second threshold temperature.

In accordance with another aspect of the present invention the detecting of the vehicle cabin temperature is made in response to determining the absence of a driver in response to an occupancy detector within a vehicle cabin.

In accordance with another aspect of the present invention, the detecting of the vehicle cabin temperature is made in response to determining the vehicle engine is stopped.

In accordance with another aspect of the present invention, the detecting of the vehicle cabin temperature is made in response to a vehicle ignition switch being in an off position.

In accordance with another aspect of the present invention, the detecting of the vehicle cabin temperature is made in response to determining an outside temperature exceeding a third temperature threshold as measured by an outside temperature sensor.

In accordance with another aspect of the present invention, the method includes deploying a vehicle sunshade in response to a luminance level exceeding a luminance threshold as measured by a luminance detector.

In accordance with another aspect of the present invention a method of controlling a temperature in a vehicle cabin is provided including detecting a driver absence using an occupancy detector, detecting a run state of a vehicle in response to the detection of the driver absence, detecting an outside temperature in response to the vehicle run stating being off, detecting a cabin temperature in response to the outside temperature exceeding an outside temperature threshold, engaging an outside air ventilation system in response to the cabin temperature exceeding a first temperature, engaging a vehicle engine and a vehicle air conditioning system in response to the cabin temperature exceeding a second temperature wherein the second temperature is greater than the first temperature, and transmitting an alert to an emergency services provider in response to the cabin temperature exceeding the second temperature.

In accordance with another aspect of the present invention including, the method includes determining a light intensity outside of the vehicle and engaging a sunshade in response to the light intensity exceeding a luminance threshold.

In accordance with another aspect of the present invention, the run state is determined in response to an ignition switch being in an off position.

In accordance with another aspect of the present invention, the light intensity is determined by a luminance detector mounted outside of the vehicle cabin.

In accordance with another aspect of the present invention, the alert is transmitted via a cellular communications network.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
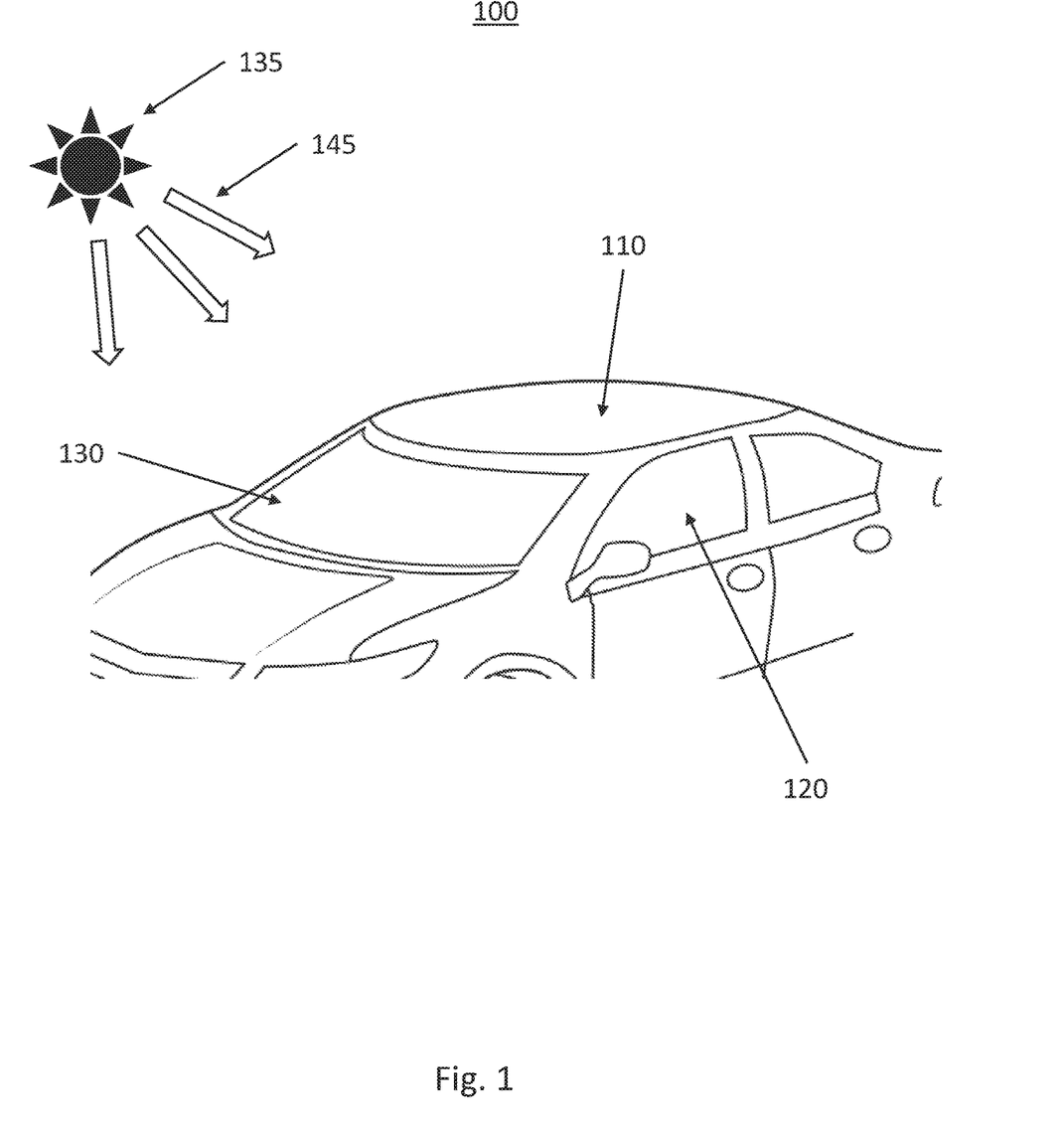
FIG. 1 shows an application for the method and apparatus for active vehicle cabin occupant protection according to an exemplary embodiment of the present disclosure.

Turning now to FIG. 1, an environment for a system 100 for active vehicle cabin occupant protection according to an exemplary embodiment of the present disclosure is shown. The exemplary environment 100 includes a vehicle 110 having a first glass surface 120, such as a window, and a second glass surface 130, such as a windshield. The vehicle 110 and second glass surface 130 are in a direct path of solar radiation 145 from the sun 135. The vehicle 110 is equipped with an active vehicle cabin occupant protection system according to an exemplary embodiment of the present disclosure.

Currently, there is no robust system to address the temperature increase within a vehicle 110 when all the windows are closed, the ventilation system is inactive and it is exposed to solar radiation 145 from the sun 135. The disclosed system and method are an active heat protection technology operative to prevent heat-stroke from occupants, such as infants and pets, left or forgotten in a vehicle 110. The system is operative to automatically control air temperature and air quality when an occupant is detected inside a vehicle. In this exemplary embodiment a driver parks a car either in an open space, such as a parking lot, or closed space, such as a garage, and the system is operative to determine if there is an occupant remaining in the vehicle 110. The system is then operative to automatically control sun shades, fans, and the air conditioner to control vehicle cabin temperature. In addition, the system may be operative to communicate with the driver, a networked service provider, such as OnStar, and/or local emergency services, such as the police, to provide an alert of the remaining vehicle occupant. If the car is in a closed space, the system may be operative to determine a CO level. If CO is detected inside the vehicle, the engine may be turned off and the networked service provider or emergency services are immediately contacted.

Figure 2:
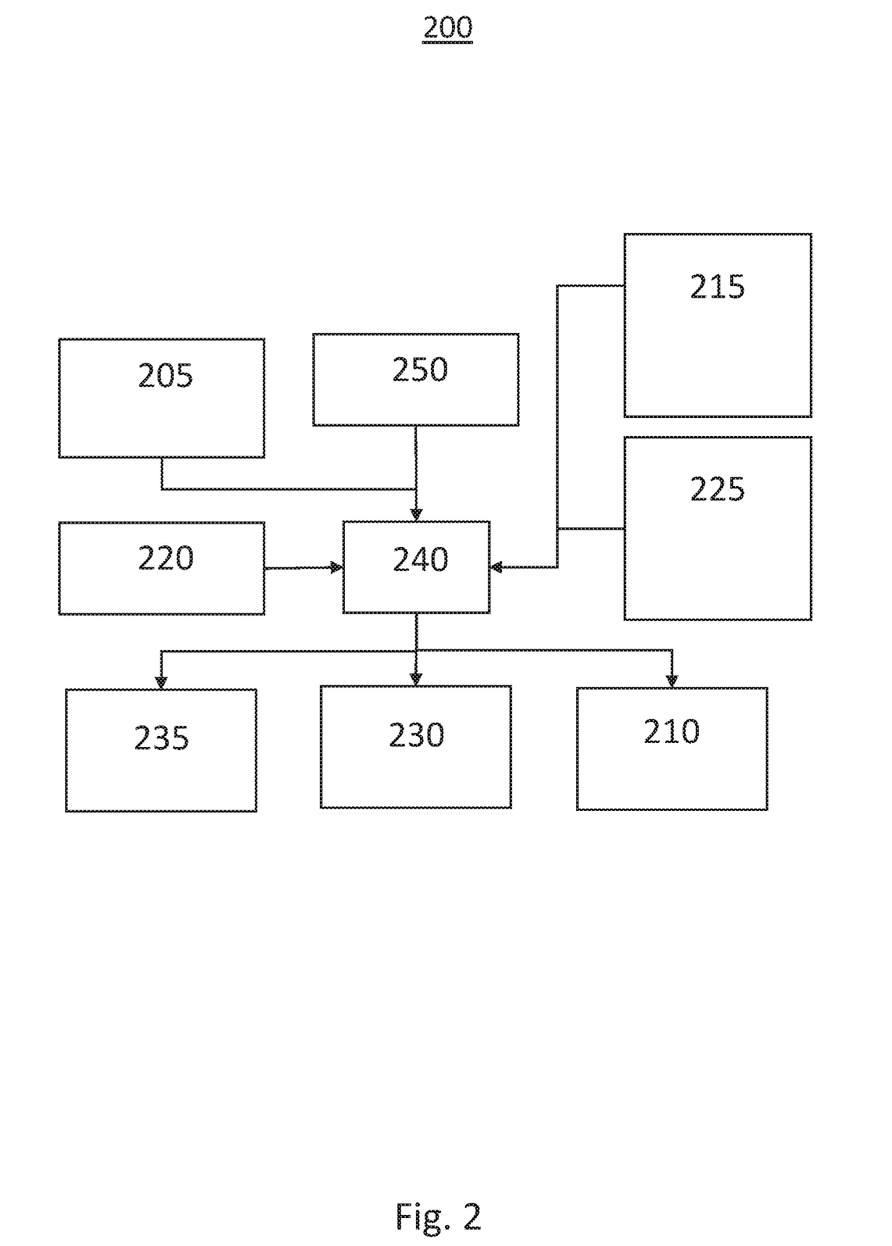
FIG. 2 shows a block diagram illustrating a system for active vehicle cabin occupant protection according to an exemplary embodiment of the present disclosure.

Turning now to FIG. 2, a block diagram of an exemplary system for active vehicle cabin occupant protection 200 according to an exemplary embodiment of the present disclosure is shown. The exemplary system 200 includes an occupancy detector 205, a vehicle controller 210, an exterior temperature sensor 215, a light sensor 220, an interior temperature sensor 225, a sunshade controller 230, an HVAC controller 235, a processor 240 and a global positioning system (GPS) 250.

The light sensor 220, or a sun load sensor, may be a photo diode or similar device, and is used to detect light levels. The light sensor 220 may be located on a dashboard, inside a glass surface, such as the windshield, or on the top of the vehicle. As the sunlight intensity incident on the light sensor increases, the light sensor's signal voltage changes. This signal voltage is coupled to the processor 240 for estimating the sunlight intensity.

The exterior temperature sensor 215 is operative to generate a signal indicative of an ambient temperature outside of the vehicle. The exterior temperature sensor 215 may be a thermocouple or the like operative to generate an electrical signal in response to changes in temperature. The exterior temperature sensor 215 is located outside of the vehicle cabin and ideally not in a location subject to direct sunlight or subject to thermal radiation from other vehicle components. The electrical signal is then coupled to the processor 240 for use by the algorithm performing the disclosed methods.

Likewise, the interior temperature sensor 225 is located inside the vehicle cabin in a location not subject to direct sunlight or thermal radiation from other vehicle components. The interior temperature sensor 225 may be a thermocouple or the like operative to generate an electrical voltage indicative of the vehicle cabin internal temperature. The electrical voltage is then coupled to the processor 240 for use by the algorithm performing the disclosed methods.

The exemplary system further includes an occupancy detector 205 for detecting the presence of a vehicle occupant. The occupancy detector 205 may be a motion detection device installed within the vehicle cabin or may be a seat switch or gravity detector within one or more seats. The occupancy detector 205 is operative to generate a signal to couple to the processor 240 indicative of the occupancy of the vehicle cabin or the corresponding vehicle seat. The occupancy detector 205 may be operative to detect a driver, and/or any occupant, such as a child or a pet, in the front or rear seats.

The processor 240 is operative to perform the algorithm for active vehicle cabin occupant protection. According to an exemplary embodiment, the processor 240 is first operative to detect if a driver is in the vehicle. This detection may be made in response to a signal from the occupancy detector 205. If the driver is estimated to not be present, the processor 240 is then operative to determine if the engine of the vehicle is running. The vehicle run state may be determined in response to a signal or a query to the vehicle controller 210 or by determining the position of the vehicle ignition switch. For example, if the vehicle ignition switch is in the off or lock position, the processor 240 may assume that the engine is not running. The processor 240 may further detect the voltage output of the alternator to determine if the engine is running. The processor 240 may query a vehicle controller 210 to determine the run state of the vehicle.

The processor 240 may further be operative to initiate cabin heat in response to the exterior temperature being less than a predetermined level and/or the interior temperature being less than a predetermined level, the driver not being present, and an occupant detected in the vehicle. In this exemplary embodiment, the processor 240 would generate a control signal to couple to the vehicle controller 210 which would then start the engine of the vehicle and generate an additional control signal to couple to the HVAC controller 230 to engage the HVAC system to increase the temperature within the vehicle cabin to a predetermined minimum temperature.

The processor 240 may be further operative to determine if an automatic window power sunshade system should be engaged. The processor 240 is operative to estimate a sunlight intensity on the vehicle indicative of direct sun exposure of the vehicle in response to an output from the light sensor 220 and/or in response to a GPS signal from the GPS 250 and time and date and vehicle orientation. If the processor estimates that the vehicle is in direct sunlight and therefore the cabin is subject to heat generated from solar radiation entering the vehicle cabin, the processor 240 is then operative to generate a control signal to couple to the sunshade controller 230 to engage the required automatic sunshades. The processor 240 may be further operative to monitor the outside temperature, interior temperature and time of day in order to disengage the automatic sunshades if they are no longer required or to engage additional or alternative sunshades at different times of day as the sun moves relative to the vehicle.

The sunshade controller 225 is operative to engage the required sunshades for the automatic window power sunshade system in response to a control signal from the processor 240. In an exemplary embodiment, a vehicle may be equipped with a windshield sunshade, a right sunshade, a left sunshade and a rear sunshade. The control signal may be indicative of which of the various sunshades to engage, such as the windshield sunshade, or may be indicative of a sun location and vehicle orientation. In response to the sun location and vehicle orientation information the sunshade controller 225 may then be operative to determine which sunshades should be engaged to increased vehicle interior temperature resulting from solar radiation. The sunshade controller 225 is then operative to generate control signals to couple to the required sunshades such that the required sunshades are engaged.

Figure 3:
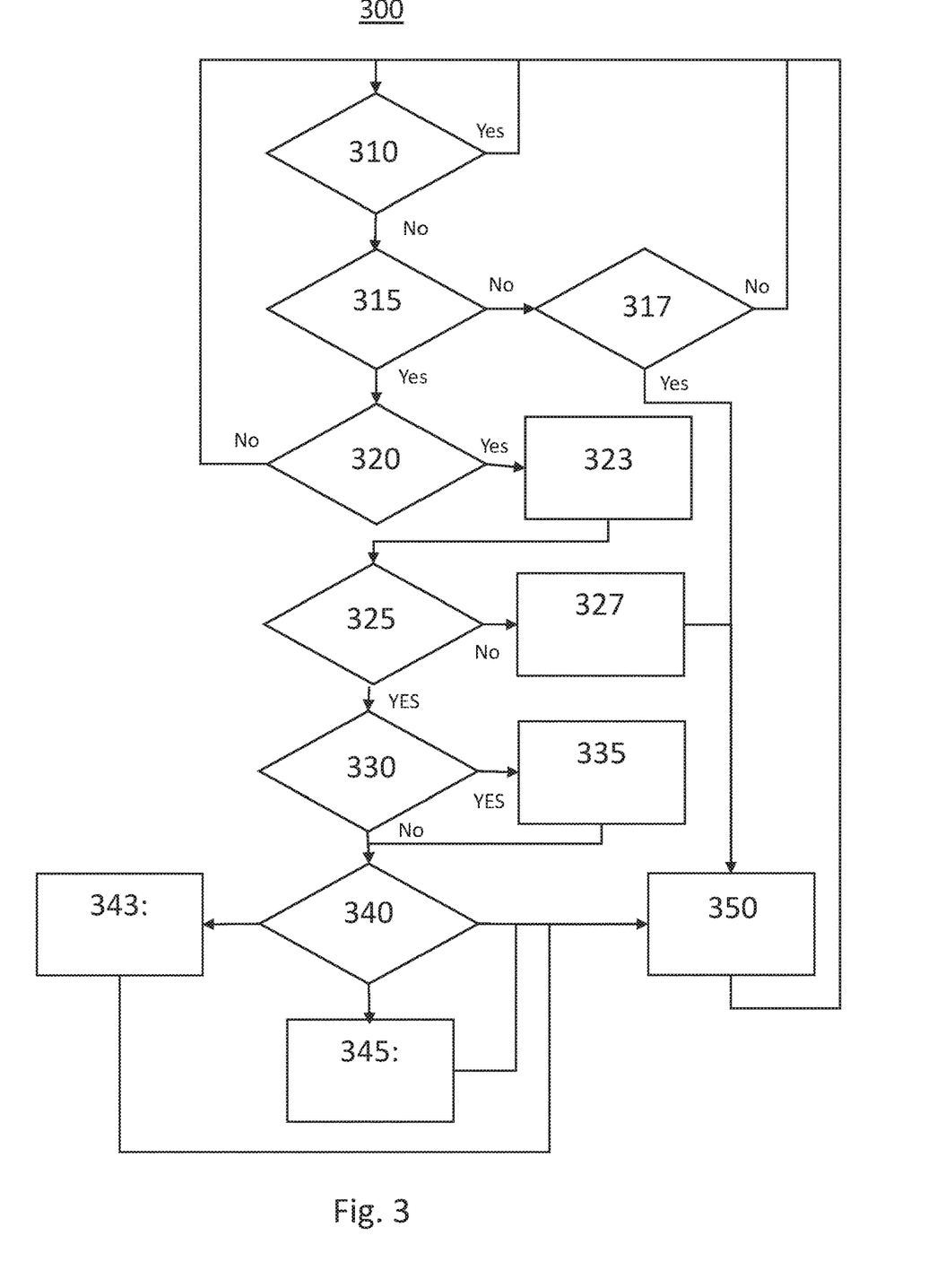
FIG. 3 shows a flow chart illustrating a method for active vehicle cabin occupant protection according to an exemplary embodiment of the present disclosure.

Turning now to FIG. 3, a flow chart illustrating an exemplary method for automatic window power sunshades deployment according to sun position in a motor vehicle 300 according to an exemplary embodiment of the present disclosure is shown. In this exemplary embodiment the method is first operative to determine if the driver is present 310 in the vehicle. This may be determined in response to a pressure switch mounted in the driver's seat, a motion detection device, detecting the presence of a key fob, data from a camera or the like. If it is determined that the driver is present in the vehicle, the algorithm is returned to the starting conditions 310. If the driver is not present in the vehicle, the method is then operative to determine 315 if the vehicle has been shut down. It may be determined that a vehicle is shutdown by monitoring an ignition switch state. If the ignition switch is in the off or lock position, the vehicle can be assumed to be in a shutdown state. Alternatively, shutdown or runs state information may be received from a vehicle processor, vehicle controller, or the like. The run state may also be determined in response to an alternator output voltage. If the alternator output voltage is zero volts, the engine may be assumed to be off and the vehicle is in a shutdown state.

If the vehicle is not in a shutdown state, the method is then operative to measure 317 a cabin carbon monoxide (CO) level. The CO level may be determined in response to a CO detector, such as a metal oxide semiconductor sensor, electrochemical sensor, or the like. If no CO is detected in the vehicle cabin, the algorithm is operative to return to the starting conditions 310. If the presence of CO is detected, or a threshold level of CO is measured in the vehicle cabin and the method is operative to contact 350 emergency services. Emergency services may be contacted by calling 911 and providing a voice prompt indicating a running vehicle with CO detected in the cabin. The voice prompt may further include the location of the vehicle, make, model, vehicle color, etc. Emergency services may be contacted through a networked service provider, such as OnStar, or by transmitting data directly to emergency services. Before contacting emergency services, the vehicle may transmit an alert to the driver indicative of the emergency situation. This may provide the driver time to remedy the situation before emergency services are contacted. If the driver is not detected, or the situation is not remedied within a predetermined time period, such as two minutes, after the alert is transmitted, the notification to emergency services may be transmitted.

If the vehicle is shutdown, the method is then operative to determine 320 if an occupant is present in the vehicle. This may be determined in response to a pressure switch mounted in the seats, a motion detection device, camera or the like. If no occupant is detected in the vehicle, the algorithm is operative to return to the starting conditions 310. If an occupant is detected in the vehicle, such as a child in the back seat, an alert is transmitted 323 to the driver. The alert may be transmitted to the driver by text message, telephone voice call, wireless signal to a key fob, activation of the vehicle horn and/or lights, etc. The alert may be indicative of the presence of an occupant, such as a pet, detected in the vehicle.

After the alert is transmitted to the driver, the method is then operative to determine 325 a temperature outside of the vehicle. The outside temperature may be used to determine if active temperature control is required for the vehicle cabin. In this exemplary embodiment, the method is operative to determine if the outside temperature is below a lower threshold temperature. If the outside temperature is below a threshold temperature, the method is operative to start 327 the vehicle engine and turn on the vehicle cabin heat. For example, if the outside temperature is below thirty degrees Fahrenheit, the temperature is deemed to be dangerously low and the vehicle heating system is employed. The method is then operative to contact emergency services 350.

If the outside temperature is not below a threshold value, the method may then be operative to determine 330 if the vehicle is in direct sunlight. The vehicle being in direct sunlight may be determined in response to a luminance detector installed on the vehicle roof, the dashboard of the vehicle or the like. The output of the luminance detector is indicative of the light intensity incident on the luminance detector. If the output of the luminance detector exceeds a threshold value, the method may assume that the vehicle is in direct sunlight.

If the vehicle is determined to be in direct sunlight, the method may then be operative to deploy 335 one or more sunshades inside the vehicle cabin in order to reduce heat generation in the vehicle cabin as a result of solar radiation entering the glass surfaces of the vehicle cabin. The sunshades may be deployed in response to a control signal from the vehicle controller in response to the light intensity indicative of direct sun exposure. After the sunshades are deployed, the method is then operative to measure an interior cabin temperature 340.

If the solar intensity is not indicative of direct sunlight, the method is next operative to determine 340 a cabin temperature inside of the vehicle cabin. The interior cabin temperature may be measured by a thermal sensor or the like installed within the vehicle cabin. The thermal sensor may generate a signal indicative of the cabin temperature to couple to the vehicle controller. If the internal temperature does not exceed a first threshold temperature, such as eighty five degrees Fahrenheit, the method is then operative to contact emergency services 350 and return to the in the algorithm is returned to the starting conditions 310. The method is continuously run and therefore will continue to monitor 340 the cabin temperature after performing the previous steps of the method. If the internal temperature does exceed a first threshold temperature, such as eighty five degrees Fahrenheit, the method is then operative to turn on the vehicle heating ventilation and air conditioning (HVAC) fan and to open the outside air inlets such that outside air is circulated in the vehicle cabin in order to reduce the cabin temperature. The method is then operative to contact emergency services 350 and the algorithm is returned to the starting conditions 310. If the cabin temperature exceeds a second, higher, threshold, such as one hundred degrees Fahrenheit, the method is then operative to start 345 the vehicle and turn on the vehicle air conditioning. The method may then operative to contact emergency services 350 and the algorithm is returned to the starting conditions 310.

When initiating a vehicle system, such as the HVAC fan or starting the engine to run the air conditioning, the method is operative to monitor the battery level and/or the gas level. If the battery voltage level drops lower than a threshold value, the vehicle may be operative to start the vehicle engine in order to recharge the battery. The vehicle may the stop the engine in response to the battery reaching a desired recharged level. The method may further be operative to monitor a fuel level when running the engine. If the fuel level drops below a threshold level, the estimated remaining run time may be transmitted to the driver and/or emergency services. In response to a low fuel level, the method may be operative to cycle, or periodically start and stop, the engine operation in order to extend the available cooling time.

Figure 4:
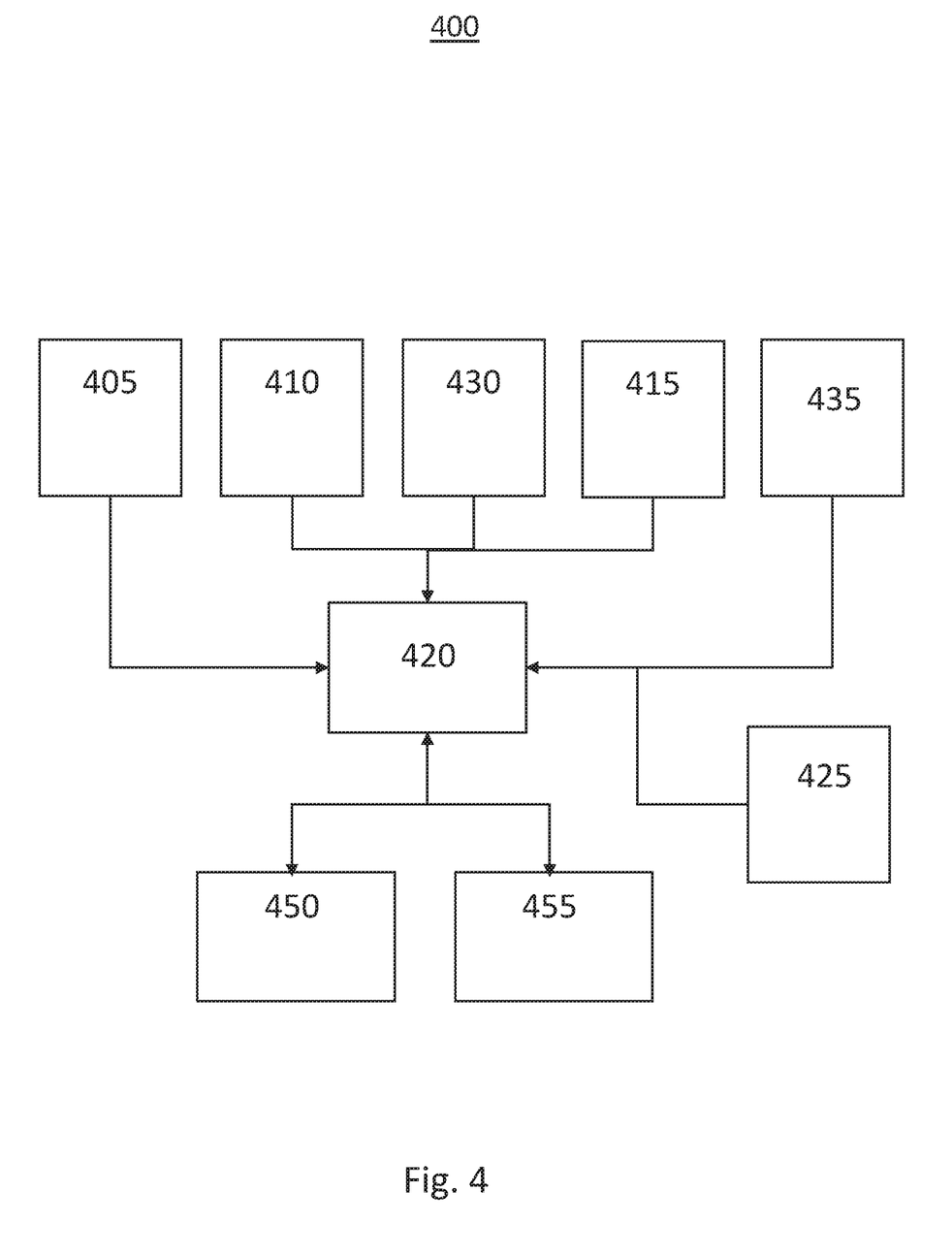
FIG. 4 shows a block diagram illustrating a system for active vehicle cabin occupant protection according to another exemplary embodiment of the present disclosure.

Turning now to FIG. 4, a block diagram of another exemplary system for active vehicle cabin occupant protection 400 according to the present disclosure is shown. The exemplary system 400 may be implemented within a vehicle as an automatic vehicle cabin temperature control system. The exemplary system 400 may include an exterior temperature sensor 405, a cabin temperature sensor 410, a luminance detector 430, a run state detector 415, a transmitter 435, a processor 420, an occupancy detector 425, a ventilation system 450 and an air conditioner 455.

The cabin temperature sensor 410 is operative to detect a vehicle cabin temperature. The exterior temperature sensor 405 is operative to detect an outside temperature outside of the vehicle. The run state detector 415 is operative to determine a run state of the vehicle engine. This run state may be on, meaning that the engine is running, or off, meaning that the engine is stopped. The run state may be determined in response to an ignition switch setting, an engine electrical output level, or from an indicator from a vehicle processor.

In this exemplary embodiment, the ventilation system 450 includes a vehicular HVAC system having a ventilation fan for air within the vehicle cabin. Fresh air may be introduced into the vehicle cabin from outside of the vehicle through an outside air duct when the ventilation system 450 is placed in a fresh air mode or non-recirculation mode and vehicle cabin air may be recirculated in the vehicle cabin when the ventilation system is placed in a recirculation mode. The ventilation system 450 further includes a fan for circulating the fresh air or vehicle cabin air throughout the vehicle cabin. The ventilation system 450 may further include a CO sensor for detecting CO levels within the vehicle cabin. The exemplary system may further include an air conditioner 455 driven by a vehicle engine for cooling the vehicle cabin. The air cooled by the air conditioner 455 may be drawn from outside the vehicle cabin when the ventilation system 450 is in fresh air mode or inside the vehicle cabin when the ventilation system 450 is in recirculation mode.

The exemplary system 400 may further include retractable sunshades and a luminance detector 430. The sunshade is deployed in response to the luminance level exceeding a luminance threshold value indicative of the vehicle being in direct sunlight. Internal cabin temperature can be greatly increased due to solar radiation being converted to heat from illuminated surfaces within the vehicle cabin. The exemplary system may further include an occupancy detector for detecting the absence or presence of a driver or another vehicle occupant such as a child or a pet. The processor 420 may initiate an algorithm for active vehicle cabin occupant protection in response to a detected occupant or in the absence of the driver. The transmitter 435 may be operative to transmit an alert to an emergency services provider in response to the vehicle cabin temperature exceeding the second threshold temperature. The transmitter 435 may be operative to transmit an alert to a driver via a mobile device or a key fob indicative of the state of the vehicle and/or the detection of an occupant.

In this exemplary embodiment, the processor 420 may be operative to perform an algorithm for active vehicle cabin occupant protection. This algorithm may be initiated in response to signals from the exterior temperature sensor 405, the cabin temperature sensor 410, the luminance detector 430, the run state detector 415, and/or the occupancy detector 425. The processor 420 is operative to control the ventilation system 450, the air conditioner 455 and the transmitter in response to these signals. In an exemplary embodiment, the processor 420 is operative for engaging the ventilation system 450 in response to the vehicle cabin temperature exceeding a first threshold temperature, such as seventy degrees Fahrenheit and for engaging the air conditioning system in response to the vehicle cabin temperature exceeding a second threshold temperature, such as ninety degrees Fahrenheit. The second threshold temperature is generally greater than the first threshold temperature. The processor 420 is further operative to engage the ventilation system 450 in response to the vehicle cabin carbon monoxide level exceeding a carbon monoxide level threshold value.

Figure 5:
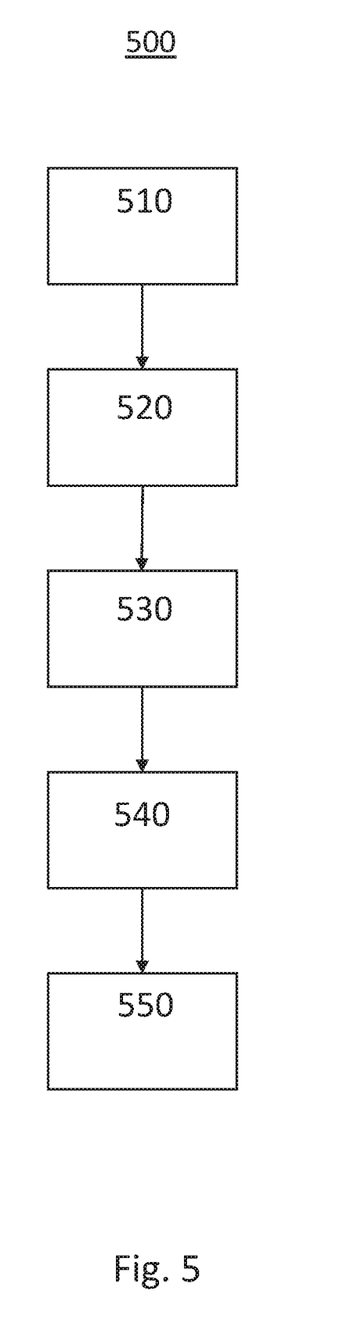
FIG. 5 shows a flow chart illustrating a method for active vehicle cabin occupant protection according to another exemplary embodiment of the present disclosure.

Turning now to FIG. 5, a flow chart illustrating another exemplary method for active vehicle cabin occupant protection in a motor vehicle 500 according to the present disclosure is shown.

The exemplary method is first operative to detect 510 a vehicle cabin temperature using a cabin thermal sensor. The vehicle cabin temperature may be detected in response to the absence of a driver in response to an occupancy detector within a vehicle cabin and/or in response to a vehicle run state, such as determining the vehicle engine is stopped. The detection of the vehicle cabin temperature may be initiated in response to determining an outside temperature exceeding a third temperature threshold as measured by an outside temperature sensor.

The method is next operative to engage 520 a vehicle fan and opening a vehicle outside air ventilation duct in response to the vehicle cabin temperature exceeding a first threshold temperature.

The method is then operative to start 530 a vehicle engine and engaging a vehicle air conditioning system in response to the vehicle cabin temperature exceeding a second threshold temperature wherein the second threshold temperature is greater than the first threshold temperature.

The exemplary method may then be operative to generate 540 an alert and transmitting the alert via a wireless network in response to the vehicle cabin temperature exceeding the second threshold temperature. The method may be further operative to deploy 550 a vehicle sunshade in response to a luminance level exceeding a luminance threshold as measured by a luminance detector.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a cabin temperature sensor operative for detecting a vehicle cabin temperature;
   a ventilation system having a fan and an outside air duct operative for introducing outside air into a vehicle cabin;
   a global positing system to provide data indicative of a vehicle location and a vehicle orientation;
   a sunshade;
   a luminance detector configured for detecting a luminance level outside of the vehicle cabin;
   and
   a processor for engaging the ventilation system in response to the vehicle cabin temperature exceeding a first threshold temperature and operative for deploying the sunshade in response to the vehicle location, the vehicle orientation, the luminance level exceeding a luminance threshold value and the vehicle cabin temperature exceeding the first threshold temperature.

2. The apparatus of claim 1 further including a transmitter operative for transmitting an alert to an emergency services provider in response to the vehicle cabin temperature exceeding a second threshold temperature.

3. The apparatus of claim 1 further including an outside temperature sensor operative for measuring an outside temperature and wherein the vehicle cabin temperature is detected in response to the outside temperature exceeding a third threshold temperature.

4. The apparatus of claim 1 further including an occupancy detector operative for detecting the absence of a driver and wherein the vehicle cabin temperature is detected in response to the detected absence of the driver.

5. The apparatus of claim 1 further including an occupancy detector operative for detecting a vehicle occupant and wherein the vehicle cabin temperature is detected in response to the detection of a vehicle occupant.

6. The apparatus of claim 1 further comprising a carbon monoxide detector operative for detecting a vehicle cabin carbon monoxide level and wherein the processor is further operative to engage the ventilation system in response to the vehicle cabin carbon monoxide level exceeding a carbon monoxide level threshold value.

7. The apparatus of claim 1 further including an air conditioning system driven by a vehicle engine operative for cooling the vehicle cabin wherein the air conditioning system is engaged in response to the vehicle cabin temperature exceeding a second threshold temperature wherein the second threshold temperature is greater than the first threshold temperature.

8. The apparatus of claim 1 further including a vehicle ignition switch and wherein the detecting of the vehicle cabin temperature is made in response to the ignition switch being in an off position.

9. A method comprising:
   detecting a vehicle cabin temperature using a cabin thermal sensor;
   detecting a vehicle location and a vehicle orientation;
   detecting a luminance level outside of a vehicle cabin;
   deploying a sunshade in response to the vehicle location, the vehicle orientation, the luminance level exceeding a luminance threshold value and the vehicle cabin temperature exceeding the first threshold temperature;
   and engaging a vehicle fan and opening an outside air ventilation duct in response to the vehicle cabin temperature exceeding a first threshold temperature.

10. The method of claim 9 further including generating an alert and transmitting the alert via a wireless network in response to the vehicle cabin temperature exceeding the second threshold temperature.

11. The method of claim 9 wherein the detecting of the vehicle cabin temperature is made in response to determining the absence of a driver in response to an occupancy detector within a vehicle cabin.

12. The method of claim 9 wherein the detecting of the vehicle cabin temperature is made in response to determining the vehicle engine is stopped.

13. The method of claim 9 wherein the detecting of the vehicle cabin temperature is made in response to a vehicle ignition switch being in an off position.

14. The method of claim 9 wherein the detecting of the vehicle cabin temperature is made in response to determining an outside temperature exceeding a third temperature threshold as measured by an outside temperature sensor.

15. The method of claim 9 further comprising starting a vehicle engine and engaging a vehicle air conditioning system in response to the vehicle cabin temperature exceeding a second threshold temperature wherein the second threshold temperature is greater than the first threshold temperature.

16. A method of controlling a temperature in a vehicle cabin comprising:
    detecting a driver absence using an occupancy detector;
    detecting a run state of a vehicle in response to the detection of the driver absence;
    detecting an outside temperature in response to the vehicle run stating being off;
    determining a vehicle location and a vehicle orientation;
    detecting a cabin temperature in response to the outside temperature exceeding an outside temperature threshold;
    determining a light intensity outside of the vehicle and engaging a sunshade in response to the vehicle location, the vehicle orientation, and the light intensity exceeding a luminance threshold;
    engaging an outside air ventilation system in response to the cabin temperature exceeding a first temperature; and
    transmitting an alert to an emergency services provider in response to the cabin temperature exceeding the second temperature.

17. The method of controlling a temperature in a vehicle cabin of claim 16 further including engaging a vehicle engine and a vehicle air conditioning system in response to the cabin temperature exceeding a second temperature wherein the second temperature is greater than the first temperature.

18. The method of controlling a temperature in a vehicle cabin of claim 16 wherein the run state is determined in response to an ignition switch being in an off position.

19. The method of controlling a temperature in a vehicle cabin of claim 16 wherein the light intensity is determined by a luminance detector mounted outside of the vehicle cabin.

20. The method of controlling a temperature in a vehicle cabin of claim 16 wherein the alert is transmitted via a cellular communications network.

* * * * *